Nov. 17, 1942.  J. H. RENSHAW  2,302,349
INSTRUCTION OUTFIT FOR THE MAKING, PLAY, AND USE OF PUPPETS OR DOLLS
Filed Feb. 17, 1941

INVENTOR
Janet H. Renshaw
BY
ATTORNEY

Patented Nov. 17, 1942

2,302,349

UNITED STATES PATENT OFFICE 2,302,349

INSTRUCTION OUTFIT FOR THE MAKING, PLAY, AND USE OF PUPPETS OR DOLLS

Janet H. Renshaw, New York, N. Y.

Application February 17, 1941, Serial No. 379,187

2 Claims. (Cl. 46—154)

The present invention relates to puppets or dolls, and is more particularly directed toward the provision of an instruction outfit suitable for use by a child to construct a complete puppet, or several such puppets, providing them with suitable garments, whereby the child may have the puppets for play, and will learn how to decorate and make them. The invention also relates to the puppets whether made by the child from the outfit, or made as completely finished articles.

As puppets are generally made in simulation of the human being, and greater play value is to be had with two puppets—one for the man, or boy, and the other for the woman, or girl,— the present invention contemplates that the article to be sold will have parts sufficient to make, decorate and clothe two such puppets. The elements to simulate the head and upper limbs are shaped to represent these parts of a person and it is preferred that the outfit include suitable paints, hair and accessories whereby the appearance of these may be enhanced. The outfit should also include pieces of fabric cut to shape to form appropriate garments, as coats, shirts, jackets, dresses, etc. likely to be worn by an individual. To facilitate fastening the parts together in such a way that one garment may be removed, and another substituted, the head and limb-like members have annular grooves into which the fabric of the garment may be held by circlets, such as tightly tied cords.

Other and further objects will hereinafter appear as the description proceeds.

The accompanying drawing shows, for purposes of illustrating the present invention, one of the many embodiments in which the invention may take form, it being understood that the drawing is illustrative of the invention rather than limiting the same.

Figure 1:
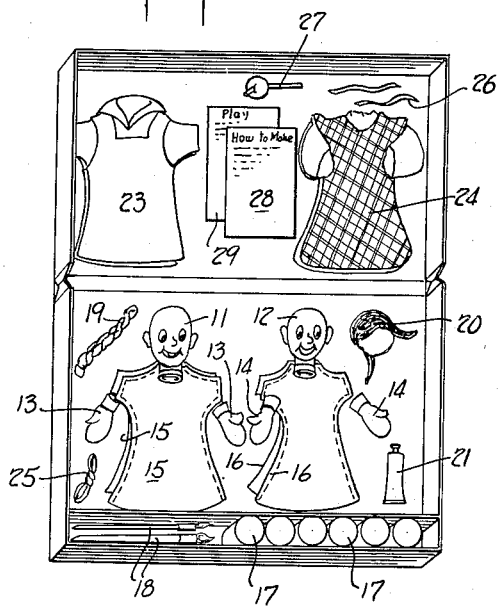
Figure 1 is a perspective view of an outfit for making two puppets, one a boy, the other a girl.

The outfit shown in Figure 1 may include all the parts required for the child to make, decorate and dress the two puppets so that they represent two characters, together with directions for making them and using them, also printed playlets for the puppets to perform and simple props to be used by the puppets. The various parts may readily be secured in a cardboard box such as indicated at 10. Head-like elements 11 and 12, limb-like elements 13, 13 and 14, 14 are made out of suitable solid or substantially rigid material, the elements 11 and 13 being intended for a boy puppet and the elements 12 and 14 for a girl puppet. Pieces of suitable pliant material, generally cloth, are shaped as shown at 15, 15 and 16, 16, so that when sewed together along the dotted lines they may form a mitten-like article with openings for the head-like and limb-like members.

Elements 11, 12, 13 and 14 may be furnished either undecorated or completely decorated, but to get the greatest play value for the child it is preferred to furnish these parts without decoration so that the child can fix them to suit its fancy and gain experience in doing so. To facilitate such decoration it is contemplated that the outfit will be provided with a number of jars 17 of suitable water color paint and paint brushes 18. Children are generally familiar with the use of such painting outfits and with the paints furnished it is possible for the child to decorate the hands and heads of the puppets making them the desired color and adding eyebrows, freckles, teeth, etc. It is also contemplated that suitable material, indicated at 19, will be provided for the hair for the boy puppet and a wig 20 for the girl puppet. These may be held in place by paste obtained from a tube indicated at 21.

The outfit may also have one or more suitable outer garments for the boy puppet, such as indicated at 23, and similar garments, indicated at 24, for the girl puppet. The outfit may also be provided with a length of string, indicated at 25, ribbons indicated at 26, a prop indicated at 27 for use in the playlet, a set of printed directions for making the puppet, indicated at 28, and printed playlets in a folder indicated at 29.

In making up the puppet from the materials provided in the outfit the child will first sew up the undergarments such as 15 or 16 along the lines of stitches as indicated so as to make a mitten or stock-like tubular article generally resembling a piece of wearing apparel which would be worn by the boy or girl. When this article is sewn up, as indicated, it is inside out and openings are left at the neck and shoulders and these openings receive the head-like and limb-like elements 11 and 13 from the inside, as indicated in Figure 2.

Figure 2:
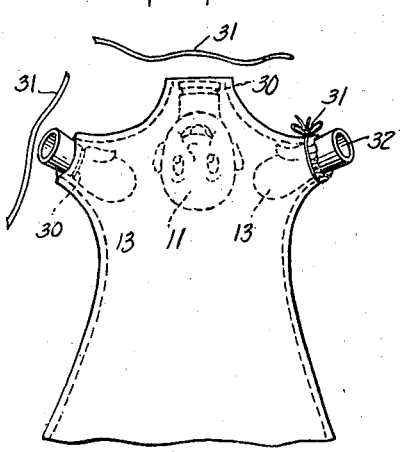
Figure 2 is a view illustrating a step in making a puppet.
Figure 3:
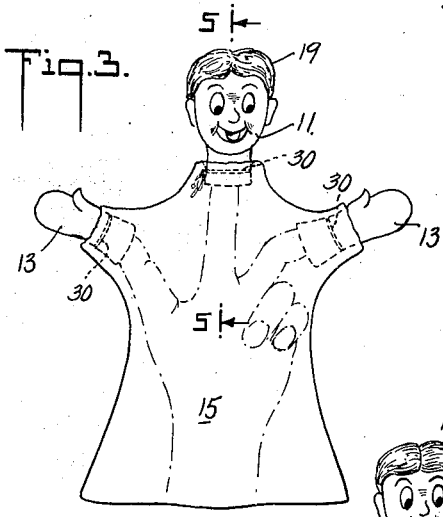
Figures 3 and 4 illustrate succeeding steps in making the puppet.
Figure 5:
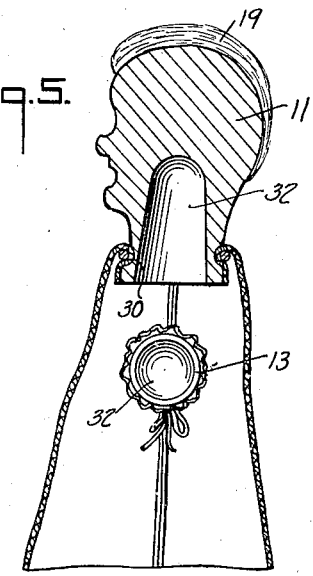
Figure 5 shows a section on the line 5—5 of Figure 3.
Figure 4:

As will be clear from the drawing these limb-like and head-like elements have grooves 30 into which the fabric may be forced by tying cords 31 tightly in place, as indicated at the right of Figure 2. These cords will therefore secure the pliant garment and the solid head-like and limb-like elements together. Other undulated formations may be provided to prevent the tied cord from slipping off endwise. The garment is then turned right side out, as indicated in Figure 3, thereby bringing the inner ends of the solid head-like and limb-like elements into the inside of the garment. The outer garment 23 may then be slipped into place as indicated in Figure 4. The elements 11, 12, 13 and 14 are provided with recesses 32 adapted to receive the thumb or finger of the hand so that when the hand is inserted into the garment the child can manipulate the head and limb-like elements.

The child may paint and decorate the head-like and limb-like elements before they have been fastened to the garment or after they have been fastened. It is preferable to have the application of the hair to the puppet's head delayed until late in the process of making the puppets.

While it is preferred that the invention be offered in the form of outfits, such as indicated in Figure 1, whereby the maximum educational benefit and play value for the child may be had so that the child learns to sew the garment and paint and decorate the parts, it is also contemplated that the completed puppet might be made and sold as such. The finished articles could have the same play value for the child so far as using them for purposes of amusement. Instead of making the garments of pieces of cloth cut to the right size they could, of course, be made of other pliant material formed to shape and secured together in some manner other than sewing. It is also possible so far as the completed article is concerned to have the garment made of a single piece of rubber or rubber-like or plastic pliant material.

The showing of the puppets as simulating the human form is illustrative. It is entirely possible to apply the invention to puppets simulating animals or birds, in which case the hand receiving cover could simulate the pelt or plumage.

It is obvious that the invention may be embodied in many forms and constructions within the scope of the claims and I wish it to be understood that the particular form shown is but one of the many forms. Various modifications and changes being possible, I do not otherwise limit myself in any way with respect thereto.

What is claimed is:

1. The method of making puppets or dolls, which consists in arranging inverted front and back garment parts in superimposed relation, sewing together the seam forming edges of the garment parts to form the completed garment having usual neck and limb engaging openings, inserting inverted head and limb-like members of an animate object through said openings from within the completed garment, binding the portions of the completed garment at the openings to the engaged parts of the head and limb-like members, and then turning the completed garment inside out so that the head and limb-like members are normally disposed and the bindings are enclosed within the garment.

2. The method as in claim 1, with the added step of finishing the exposed portions of the head and limb-like members in simulation of natural features and coloring.

JANET H. RENSHAW.